United States Patent [19]

White et al.

[11] Patent Number: 5,060,504
[45] Date of Patent: Oct. 29, 1991

[54] SELF-CALIBRATING ACCELEROMETER

[75] Inventors: Craig W. White, Grosse Pointe; Leonard W. Behr, Pontiac; Kevin E. Musser, Farmington, all of Mich.

[73] Assignee: Automotive Systems Laboratory, Inc., Farmington Hills, Mich.

[21] Appl. No.: 413,318

[22] Filed: Sep. 27, 1989

Related U.S. Application Data

[63] Continuation-in-part of Ser. No. 248,362, Sep. 23, 1988, abandoned.

[51] Int. Cl.$^5$ .............................................. G01P 21/00
[52] U.S. Cl. ..................................... 73/1 D; 73/517 R
[58] Field of Search ................. 73/517 R, 517 B, 1 D, 73/1 DV

[56]     References Cited
U.S. PATENT DOCUMENTS

| | | | |
|---|---|---|---|
| 4,473,768 | 9/1984 | Kerr et al. | 73/517 B |
| 4,488,445 | 12/1984 | Aske | 73/517 R |
| 4,679,434 | 7/1987 | Stewart | 73/517 B |

Primary Examiner—John E. Chapman
Attorney, Agent, or Firm—Lyon & Delevie

[57] ABSTRACT

An acceleration sensor having a sensing mass supported relative to a frame by a plurality of beams having a plurality of resistors integral therewith. The resistance of the beam resistors varies as the sensing mass is displaced relative to the frame in response to acceleration of the frame in a direction generally normal to the plane of beam extension. The displacement of the sensing mass due to such acceleration produces a corresponding change in the output of a Wheatstone bridge incorporating the beam resistors in the legs thereof. At least one leg of the bridge additionally has a resistor of variable resistance in series with the beam resistor thereof, the resistance of which is controlled by a microprocessor, whereby the bridge output is adjusted to compensate for temperature effects and manufacturing tolerances. The output of the electrical control circuit for the sensor is periodically calibrated by electrostatically deflecting the sensing mass relative to the frame, whereby the sensing mass is subjected to the equivalent of a known accelerating field, and using the resultant change in bridge output as a reference value for calibrating the instantaneous changes in bridge output resulting from the acceleration of the sensor frame.

22 Claims, 4 Drawing Sheets

SELF-CALIBRATING ACCELEROMETER

CROSS REFERENCE TO RELATED APPLICATIONS

The instant application is a continuation-in-part of U. S. Patent Application Ser. No. 07/248,362 filed Sept. 23, 1988, now abandoned.

BACKGROUND OF THE INVENTION

The instant invention relates to apparatus for sensing variations in the speed of an object, such as a motor vehicle, and microprocessor-controlled circuitry therefor to provide a calibrated output signal notwithstanding manufacturing tolerances and changes in sensor response due to changes in the operating environment thereof The prior art teaches sensors having a sensing mass cantilevered on a support beam which is displaced generally normal to the direction of beam extension by an accelerating force. A plurality of strain gages bonded to the beam or diffused into the surface thereof are connected to a Wheatstone bridge in a manner familiar to those skilled in the art, whereby an output proportional to the amount of such sensing mass displacement is obtained. Unfortunately, the output from the strain gages is adversely affected by creep and hysteresis losses. Moreover, the resistance of the strain gages and, hence, the output of the Wheatstone bridge connected thereto vary greatly with temperature. The variation in bridge output due to temperature is further complicated, for example, where the sensing mass and its supporting beam are micromachined from silicon, as the relationship between the deflection of the sensing mass and temperature is unknown. Still further, such sensors are typically manufactured at high temperatures and subsequently cooled, whereby a thermal prestress is generated therein which is released or otherwise manifests itself as the operating temperature of the sensor varies. As a result, the sensor must be recalibrated on a continuing basis. Additionally, variations in the manufacturing process require additional manufacturing steps such as sensor resistance trimming which increase unit cost and reduce production volume.

SUMMARY OF THE INVENTION

It is an object of the instant invention to provide an acceleration sensor and an electrical control circuit therefor which provides an output which remains unaffected by temperature changes in the operating environment thereof.

A further object of the instant invention is to provide control circuitry for an acceleration sensor which automatically compensates for variations in sensor output due to variation in the manufacturing process therefor, thereby obviating extreme tolerance control in the sensor manufacturing process and eliminating the need for subsequent tailoring of the sensor control circuit to the specific characteristics of an individual sensor which was heretofore necessary in obtaining a proper mating of the sensor with the control circuit.

The acceleration sensor of the instant invention comprises a rigid, insulating frame having one or more coplanar beams extending therefrom to support a sensing mass. The sensing mass is responsive to acceleration of the frame so that the center of mass thereof is displaced by such acceleration in a direction substantially normal to the plane of the beams from an initial position relative to the frame towards a second position relative thereto Each of the supporting beams has one or more resistors integral therewith whose resistance varies in response to deflection of the beams and, hence, in response to the displacement of the sensing mass. Where desired, the beams provide diametrical support for the sensing mass thereof.

The instant sensor further comprises means for electrostatically displacing the sensing mass from its initial position to a third position short of the second position thereof, such as layers of a nonmagnetic electrically conductive material on opposed surfaces of the sensing mass and frame, respectively. Upon the delivery of unlike charges to the layers, respectively, the sensing mass is displaced to the third position by the resulting electrostatic field in a manner analogous to being displaced by a known accelerating field.

The electrical circuit for generating a calibrated output signal from the instant sensor comprises a Wheatstone bridge having a pair of input and output terminals defining the four legs thereof, and a voltage source impressing a potential across the input terminals of the bridge. At least one of the legs of the bridge comprises one or more beam resistors. Additionally, at least one of the legs of the bridge further comprises a variable-resistance resistor, the resistance of which is adjusted by suitable control means therefor, such as a microprocessor, whereby the range of voltages developed across the output terminals of the bridge is adjusted to compensate for changes in sensor operating temperature and to accommodate manufacturing tolerances.

The instant electrical circuit further comprises means for determining the voltage developed across the output terminals of the bridge, such as an analog-to-digital converter port on the microprocessor connected to the bridge output terminals by a differential amplifier; means for actuating the electrostatic displacement means of the instant sensor, such as a switch operable by the microprocessor for delivering the supply voltage across the layers; and means for generating a calibrated output signal derived from the instantaneous bridge output and adjusted to reflect changes in sensor response due to changes in the operating temperature thereof, as by comparing the instantaneous change in bridge output due to frame acceleration with the instantaneous change in bridge output due to electrostatic displacement of the sensing mass relative to the frame.

BRIEF DESCRIPTION OF THE DRAWINGS

In the drawings, wherein like reference numerals are employed to designate like components among the various embodiments of the instant invention.

DETAILED DESCRIPTION OF THE PREFERRED EMBODIMENTS OF THE INVENTION

Figure 1:
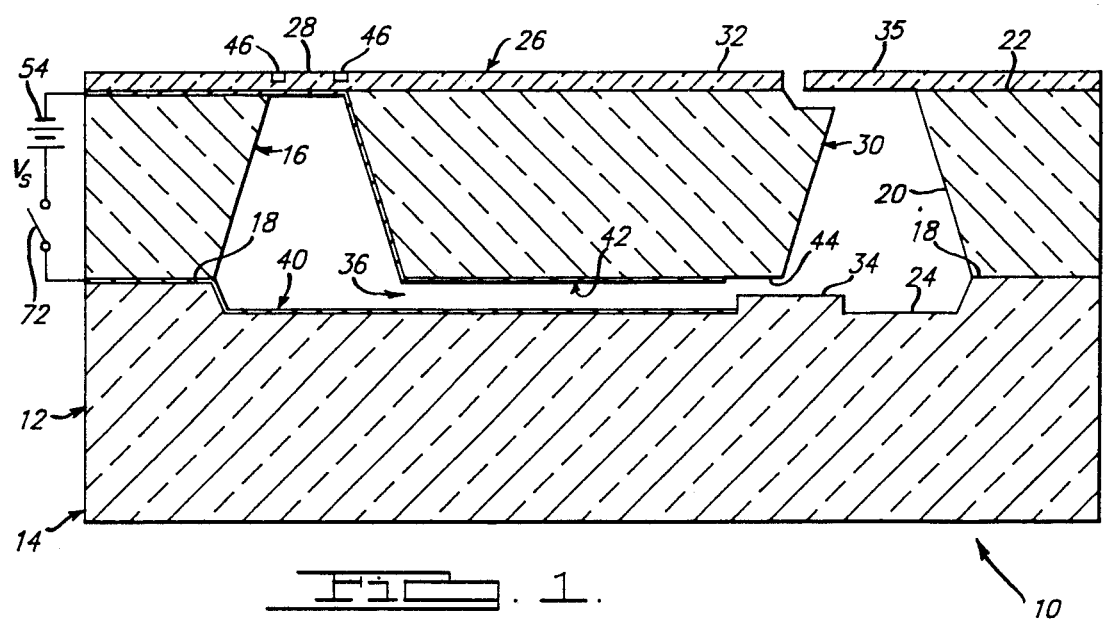
FIG. 1 is a cross-sectional view of a first exemplary embodiment of the acceleration sensor of the instant invention
Figure 2:
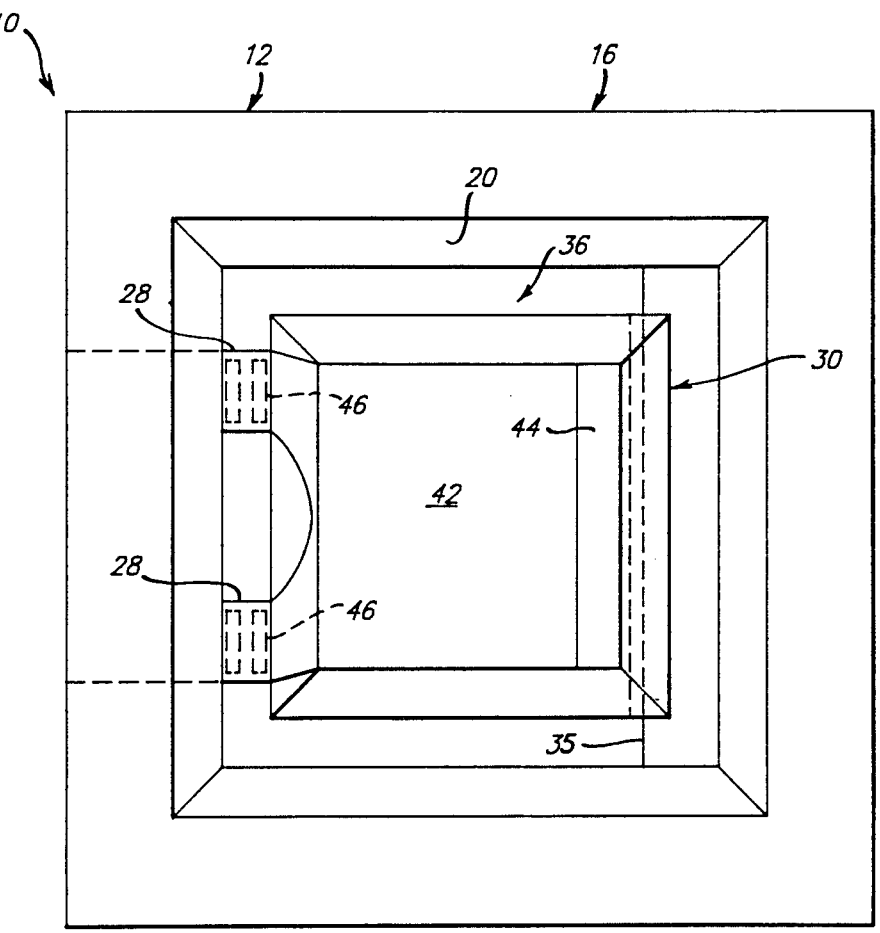
FIG. 2 is a bottom view of the first embodiment of the instant acceleration sensor with the base thereof removed.

Referring to FIGS. 1 and 2, a first exemplary embodiment 10 of the acceleration sensor of the instant invention comprises a frame 12 having a lower section, or base 14, formed of an insulating material such as pyrex and an upper section 16 formed of insulating material such as silicon secured to the upper surface 18 of the base 14 as by bonding therewith. An aperture 20 extends through the upper section 16 of the frame 12 from the upper surface 22 thereof so as to expose the upper surface 24 of the base 14. A thin, planar section 26 of a semiconductor material such as silicon is bonded to the upper surface 22 of the upper frame 16 so as to provide a pair of beams 28 which extend across the aperture 20 therein generally parallel to the upper surface 24 of the base 14. A sensing mass 30, also micromachined from an insulating material such as silicon, is secured to the free ends 32 of the beams 28 as by bonding, whereby the sensing mass 30 is supported in a cantilevered fashion relative to the frame 12 by the beams 28. Alternatively, the planar section 26 and the sensing mass 30 are micromachined from a single block of semiconductor material such as silicon.

The sensing mass 30 is thus free to be displaced from an initial position relative to the upper frame 16 towards a second position relative thereto in a direction substantially normal to the plane of the beams 28 in response to acceleration of the frame 12 in a direction opposite thereto. A number of protrusions or stops 34 and 35 project from the base 14 and upper frame 16, respectively, for limiting the amount of the displacement of the sensing mass 30 relative to the frame 12. The basal stop 34 thus defines the second position relative to the frame 12 towards which the sensing mass 30 may be displaced by any given acceleration of the frame 12. The gap 36 between the sensing mass 30 and the frame 12 is suitably configured to provide the desired level of gas damping for the sensing mass 30.

The instant sensor 10 further comprises a layer 40 of a nonmagnetic electrically conductive material such as aluminum deposited as by a CVD process on the exposed upper surface 24 of the base 14. The conductive layer 40 on the base 14 thus extends generally parallel to the plane of the supporting beams 28 when the sensing mass 30 is in its initial position relative to the frame 12 A layer 42 of nonmagnetic electrically conductive material such as aluminum is also deposited as by a CVD process on the underside 44 of the sensing mass 30 so as to be placed in opposition with the conductive layer 40 on the base 14. The layers 40 and 42 permit the electrostatic displacement of the sensing mass 30 relative to the frame 12 in the absence of an accelerating field upon the delivery of unlike electrical charges to the layers 40 and 42, respectively, as described hereinbelow.

A pair of resistors 46 are formed integral with each beam 28, respectively, as by doping selected portions of the upper surface 48 of each beam 28. For example, the beams may be doped with boron or arsenic ions using a CVD process or ion implant techniques. The resistance of the beam resistors 46 varies in response to beam deflection caused by displacement of the sensing mass 30 relative to the frame 12.

Figure 3:
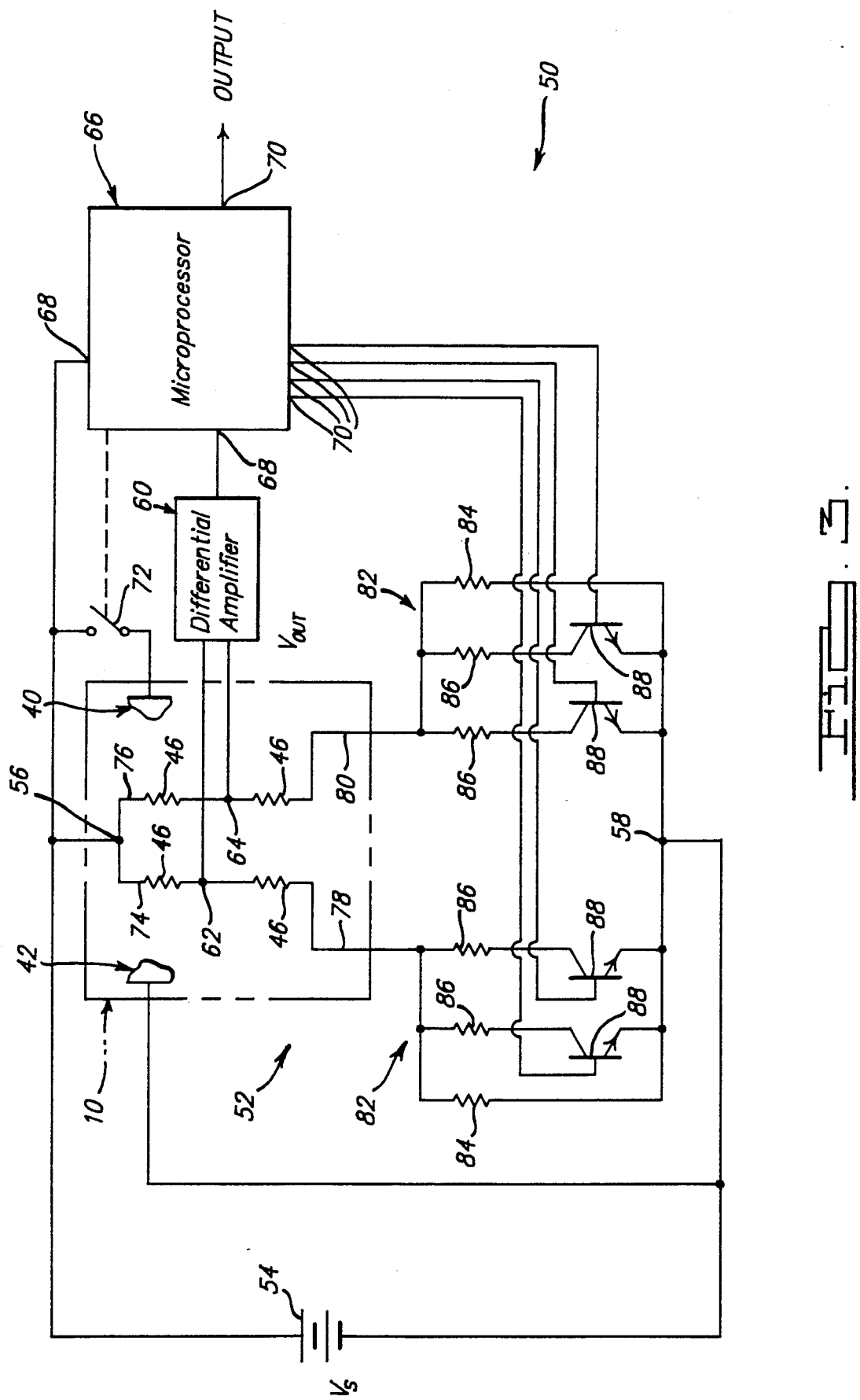
FIG. 3 is a diagrammatic schematic of an electrical circuit for generating a calibrated output signal from the instant acceleration sensor.

The electrical circuit 50 for generating a calibrated output signal OUTPUT derived from the instantaneous resistance of the beam resistors 46 of the instant sensor 10 and adjusted for temperature effects thereon is shown schematically in FIG. 3. The electrical circuit 50 comprises a Wheatstone bridge 52; a voltage supply, such as a battery 54, which impresses a potential $V_S$ across the input terminals 56 and 58 of the bridge 52; a differential amplifier 60 connected to the output terminals 62 and 64 of the bridge 52 for amplifying the voltage $V_{OUT}$ developed thereacross: and a microprocessor 66 having a pair of analog-to-digital converter ports 68 thereon for reading the output of the differential amplifier 60 and the instantaneous amplitude of the supply voltage $V_S$, and a plurality of output ports 70 thereon for controlling the range of voltages developed across the output terminals 62 and 64 of the bridge 52.

More specifically, the beam resistors 46 integral with the beams 28 of the sensor 10 are connected between the four terminals 56, 58, 62, and 64 of the Wheatstone bridge 52 to comprise the four legs 74, 76, 78, and 80 thereof. The position of each beam resistor 28 about the bridge 52 is determined in a manner known to those skilled in the art so as to maximize the change in the bridge output voltage $V_{OUT}$ upon displacement of the sensing mass 30 relative to the frame 12.

In addition, a resistor 82 of variable resistance is placed in series with each beam resistor 28 in the two lower legs 78 and 80 of the bridge 52. In the preferred embodiment of the instant invention, the variable resistors 82 comprise resistors 84 of fixed resistance placed in series with the beam resistors 46 of legs 78 and 80, respectively, and a number of additional resistors 86 of fixed resistance which are switched under microprocessor control into parallel relation therewith, respectively. The switches operable by the microprocessor 66 for switching each additional resistor 86 in parallel with one of the series resistors 84 comprise a transistor 88, the emitter of which is connected to terminal 58 of the bridge 52 and the collector of which is connected to the additional resistor 86. The microprocessor 66 connects an additional resistor 86 into parallel relation with one of the series resistors 84 by delivering current from an output port 70 thereon to the base of the transistor 88 connected therewith.

The microprocessor 66 is thus able to effect step changes in the resistance of legs 78 and 80 of the bridge 52 so as control the range of voltages developed across the output terminals 62 and 64 thereof during operation of the sensor 10. In this manner, the electrical control circuit 50 compensates for changes in bridge output $V_{OUT}$ due to variations in sensor operating temperature, in addition to accommodating manufacturing tolerances in the nominal resistances of the beam resistors 46.

Moreover, the electrical control circuit 50 is able to limit the output $V_{OUT}$ of the bridge 52 to a range of voltages which will avoid saturation of the differential amplifier 60, even where the sensing mass 30 is maximally displaced by acceleration of the frame to the second position relative thereto, i.e., into engagement with the basal stop 34. For example, when the microprocessor 66 determines that the bridge output $V_{OUT}$ falls outside of the allowable range of values necessary to avoid saturation of the differential amplifier 60, the microprocessor 66 begins to sequentially connect the additional resistors 86 into parallel relation with series resistors 84 of legs 78 and 80, respectively, until the average bridge output $V_{OUT}$ once again falls within the allowable range. It is noted that, while FIG. 3 shows only two switchable additional resistors 86 on each leg 78 and 80, the number of additional resistors 86 employed, and the resistance values thereof, are selected so as to provide optimum flexibility and performance.

It is noted that a purpose for tightly controlling of the output voltage $V_{OUT}$ of the bridge 52 is to permit the control circuit 50 to accurately determine when the acceleration input to the frame 12 exceeds a threshold value, whereupon the output OUTPUT from the control circuit 50 triggers an instrumentality, such as an air bag in a vehicle passenger restraint system (not shown). Thus, where a range of bridge output values is of particular significance, such as a bridge output $V_{OUT}$ approaching the threshold value, a second differential amplifier (not shown) having a different gain as the first differential amplifier 60 may be connected across the output terminals 62 and 64 of the bridge 52 to provide increased resolution with respect to that output range. In this regard, it is further noted that fewer switchable additional resistors 86 are thus required on each leg 78 and 80, as the redundancy provided by the two differential amplifiers provides the desired resolution, notwithstanding the early saturation of one of the differential amplifiers due to the higher gain thereof.

A running average value of the microprocessor-adjusted and amplified bridge output (hereinafter referred to as $V_{OUT}$ for the sake of clarity) is thereafter used as the base-line for comparison with the instantaneous output $V_{OUT,i}$ of the bridge 52. Where the instant sensor 10 is utilized in a vehicle passenger restraint system as an acceleration sensor therefor, the instantaneous changes in bridge output $V_{OUT}$ correspond to the displacement of the sensing mass 30 due to vehicle acceleration. A possible vehicle crash condition is indicated when the instantaneous bridge output $V_{OUT,i}$ exceeds the average bridge output $V_{OUT}$ by a threshold value, whereupon the microprocessor 66 assumes a crash condition and an average bridge output $V_{OUT}$ is no longer calculated. The average bridge output $V_{OUT}$ immediately prior to the indication of a possible crash condition is thereafter used as the baseline for comparison with the instantaneous output $V_{OUT,i}$ in order to further evaluate the vehicle acceleration profile. If the instantaneous output $V_{OUT,i}$ ceases to exceed the threshold value, a counter in the microprocessor is decremented. If the output does not exceed the threshold value for many consecutive readings, the microprocessor clears the crash condition by zeroing all accumulation counters therein, and normal averaging of the bridge output $V_{OUT}$ resumes.

The microprocessor 66 is also provided with a plurality of output ports 70 thereon for controlling the delivery of the unlike electrical charges to the conductive layers 40 and 42 of the sensor 10, respectively, and for providing the calibrated output signal OUTPUT.

Figure 4:
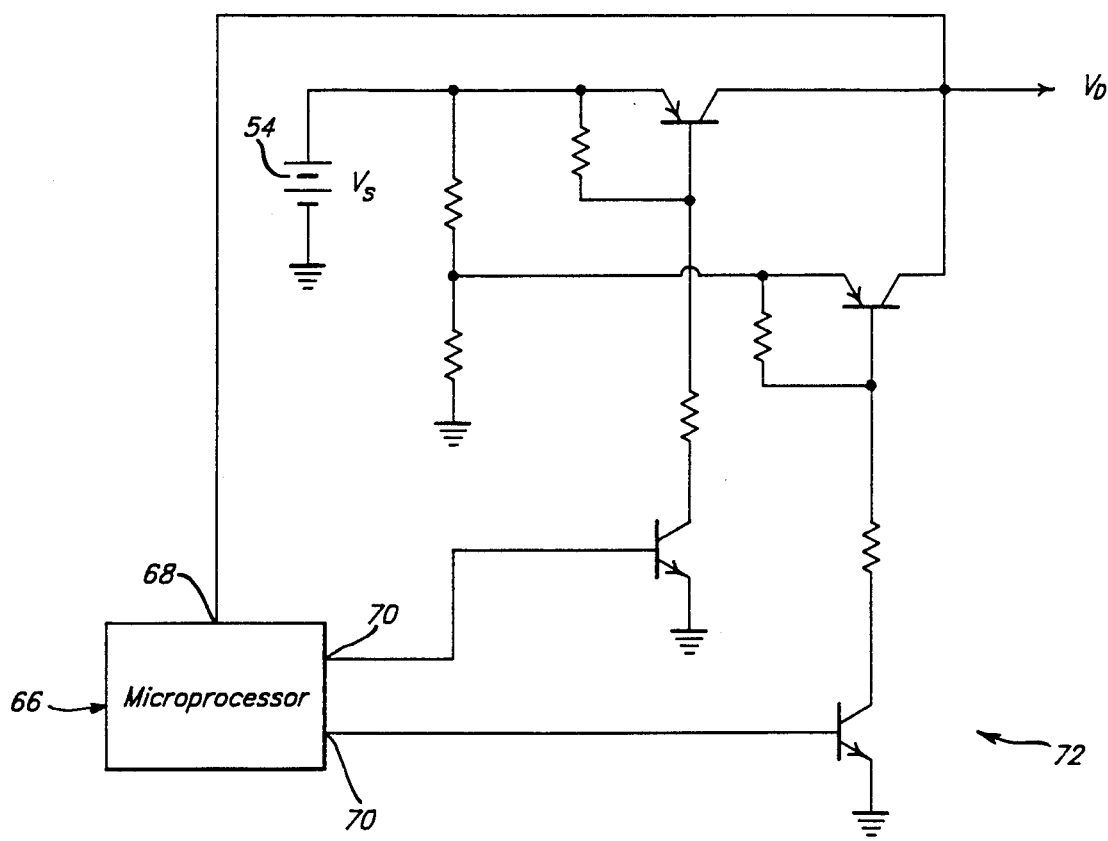
FIG. 4 is a diagrammatic schematic of the microprocessor-controlled switch for depositing unlike charges on the opposed aluminum layers of the instant sensor, whereby the sensing mass of the sensor is electrostatically displaced relative to the frame thereof.

The microprocessor 66 controls the delivery of unlike charges to the conductive layers 40 and 42 of the sensor 10 as by operating a switch 72 connecting the base layer 40 with the supply voltage $V_S$ (with the layer 42 on the sensing mass 30 already being permanently connected to ground). A schematic of an exemplary switch 72 connecting the base layer 40 with the supply voltage $V_S$ and operable by a pair of output ports 68 on the microprocessor 66 to apply two different potentials thereto is illustrated in FIG. 4.

With respect to the generation of a calibrated output signal OUTPUT from the sensor 10, the electrical control circuit 50 of the instant invention utilizes the controlled electrostatic displacement of the sensing mass 30 relative to the sensor frame 12 to periodically recalibrate the output signal OUTPUT to accurately reflect the true acceleration profile of the vehicle. More specifically, during initial calibration of the sensor 10 and the associated control circuitry 50 therefor, the instantaneous change in bridge output $V_{OUT}$ resulting from a known accelerating field, as by temporarily orienting the sensor 10 so that the beams 28 thereof extend substantially perpendicular to the earth's gravitational field, is compared with the instantaneous change in bridge output $V_{OUT}$ upon electrostatic displacement of the sensing mass 30 by a known calibrating displacement voltage $V_{D,c}$ at a constant calibrating temperature $T_c$. The electrostatic field displacing the sensing mass 30 is thus effectively calibrated in terms of the known accelerating field, i.e., a unitary gravitational field. The instantaneous output $V_{OUT,i}$ of the bridge 52 may thereafter be periodically calibrated at any temperature $T_i$ by applying a like electrostatic deflection voltage $V_{D,c}$ across the conductive layers 40 and 42 of the sensor 10 and comparing the resultant change in bridge output $V_{OUT}$ with the earlier values therefor, as the sensing mass 30 is effectively being displaced by a known accelerating field.

Still further, the instantaneous change in bridge output voltage $V_{OUT,i}$ due to the electrostatic displacement of the sensing mass 30 relative to the frame 12 appears to be a function of the electrostatic displacement voltage VD and otherwise constant sensor parameters. Accordingly, it is believed that the instantaneous electrostatic displacement voltage $V_{D,i}$ need not be equal to the original electrostatic displacement voltage $V_{D,c}$ for calibration of the instantaneous output $V_{OUT,i}$ of the bridge 52. Thus, the instant invention additionally avoids the costs encountered in otherwise having to tightly control the electrostatic displacement voltage $V_D$. Accordingly, the instant invention employs simple switching means, such as the transistor/resistor circuit shown in FIG. 4, to provide a displacement voltage $V_D$ equal to either the supply voltage $V_S$ or a percentage thereof Specifically, a displacement voltage $V_D$ equal to the supply voltage $V_S$ is used to fully deflect the sensing mass 30 to the second position against the basal stop 34 to test for the presence of foreign objects, such as dust particles (not shown), in the gap 36 between the sensing mass 30 and the upper surface 24 of the base 14. A displacement voltage $V_D$ equal to a percentage of the supply voltage $V_S$ is used to partially displace the sensing mass 30 from its initial position relative to the frame 12 towards the second position relative thereto for calibration of the output signal OUTPUT. Where the instantaneous electrostatic displacement voltage $V_{D,i}$ differs from the original calibrating displacement voltage $V_{D,c}$, the microprocessor 66 reads the instantaneous electrostatic displacement voltage $V_{D,i}$ for use in calculating the equivalent accelerating field experienced by the sensing mass 30 during such electrostatic displacement thereof.

From the foregoing, it will be readily appreciated that the instant invention permits the use of a nonregulated voltage supply 54 to provide the electrostatic deflection voltage $V_D$, thereby avoiding the use of a more costly regulated voltage source. Specifically, in order to electrostatically calibrate the instant sensor 10, the nonregulated voltage supply 54 is coupled to the layers 40 and 42 by operating switch 72 and thereafter allowed to droop, with the microprocessor 66 monitoring its instantaneous value over time. When the desired instantaneous value of the electrostatic deflection voltage $V_{D,i}$ is reached, the microprocessor 66 measures the instantaneous output $V_{OUT,i}$ of the bridge 52 for use in determining the instantaneous sensitivity $S_i$ of the sensor 10 in the manner described hereinabove.

It is noted, however, that the slope of the droop in the deflection voltage, i.e., the rate of change of the instantaneous electrostatic displacement voltage $V_{D,i}$ over time subsequent to the connection of the nonregulated voltage supply 54 with the layers 40 and 42, must be sufficiently slow such that the mechanical response of the suspended sensing mass 30 does not appreciably lag behind the instantaneous electrostatic deflection voltage $V_{D,i}$. In this manner, the transient dynamic response of the sensing mass 30 to application of the calibrating electrostatic field is held to a minimum, and the sensor is calibrated using a substantially steady state electrostatic calibrating field $F_c$.

The calibration of the instant sensor 10 and the generation of the calibrated output signal OUTPUT may be illustrated as follows: during sensor production, a circuit board (not shown) comprising the sensor 10 and the electrical control circuit 50 therefor is laid flat on a number of vertically extending probes in what is generally referred to as a "bed of nails" test, whereby various voltages about the circuit are measured to ensure circuit integrity. The sensing mass 30 is thus oriented so as to be subjected to the gravitational field of 1 G and is displaced thereby from its initial position relative to the sensor frame 12 towards a second position relative thereto. When power is first delivered to the circuit board, the microprocessor 66 reads various locations in a nonvolatile memory unit, such as an EEPROM (not shown), connected therewith. If these values are zero, the sensor has not yet been calibrated, and the microprocessor 66 reads the first calibrating output $V_{OUT,c1}$ of the bridge 52 corresponding to the 1 G acceleration field at the calibrating temperature $T_c$, whereafter the microprocessor 66 stores the value of $V_{OUT,c1}$ in the EEPROM.

The circuit board is thereafter assembled into a housing (not shown) and potted therein, whereupon the circuit board is again tested at temperature $T_c$ to ensure sensor and circuit integrity. The housing is oriented in the position it will occupy when mounted in a vehicle, with the plane of the beams 28 supporting the sensing mass 30 thus extending substantially parallel with the gravitational field, whereby the sensing mass 30 returns to its initial position relative to the sensor frame 12. The microprocessor 66 checks the EEPROM for the presence of the first calibration value $V_{OUT,c1}$ stored therein and further determines that all calibration constants have not yet been calculated. The microprocessor 66 then reads the second calibrating output $V_{OUT,c2}$ of the bridge 52 in the absence of an accelerating field and at the calibration temperature $T_c$. The difference between $V_{OUT,c1}$ and $V_{OUT,c2}$ is the calibrated "sensitivity" $S_c$ of the sensor 10, i.e., the change in bridge output $V_{OUT}$ due to an acceleration of 1 G, at temperature $T_c$.

With the sensor 10 still at the calibration temperature $T_c$, the microprocessor 66 then actuates the switch 72 to apply a first calibrating displacement voltage $V_{D,c}$ to the conductive layers 40 and 42 of the sensor 10, whereby the sensing mass 30 is displaced electrostatically. The microprocessor 66 reads and stores the amplitude of the first calibrating bridge output $V_{OUT}$ by reading the resultant bridge output $V_{OUT,D,c}$ and subtracting therefrom the average output $V_{OUT}$ of the bridge 52, whereafter the resultant value is stored in the EEPROM.

The accelerating field equivalent of the first calibrating electrostatic field is then calculated for use in interpreting instantaneous changes in bridge output $V_{OUT}$. Specifically, the equivalent field $F_c$ (in Gs) is calculated by the microprocessor 66 using the following formula:

$$F_c = \frac{V_{OUT,D,c} - V_{OUT}}{S_c}$$

Where the instantaneous calibrating electrostatic deflection voltage $V_{D,i}$ equals the first calibrating electrostatic deflection voltage $V_{D,c}$, the instantaneous 30 sensitivity $S_i$ of the sensor 10, i.e., the instantaneous change in the bridge output voltage $V_{OUT}$ which corresponds to an acceleration of 1 G, can be calculated as follows:

$$S_i = \frac{V_{OUT,D,i} - V_{OUT}}{F_c}$$

Where the instantaneous calibrating electrostatic displacement voltage $V_{D,i}$ is not equal to the first calibrating electrostatic displacement voltage $V_{D,c}$, the instantaneous sensitivity $S_i$ nonetheless remains a function of the electrostatically-induced instantaneous change in bridge output $V_{OUT,D,i}$ and the sensor calibration constants, with the precise relationship therebetween being established by suitable means.

It is noted that the first calibrating electrostatic voltage $V_{D,c}$ and the instantaneous calibrating electrostatic voltage $V_{D,i}$ (where the latter differs from the former) are preferably chosen so as not to fully displace the sensing mass 30 towards the second position relative to the frame 12, i.e., into contact with the stop 34 protruding from the upper surface 24 of the base 14. Additionally, it is noted that, under the instant invention, the conductive layer 40 on the base 14 and the opposed conductive layer 42 on the sensing mass 30 may be normally biased to a like potential, e.g., to a nominal voltage of +5 volts. The sensing mass 30 is thereafter electrostatically displaced by increasing or decreasing the potential of either of the layers 40 or 42.

Figure 5:
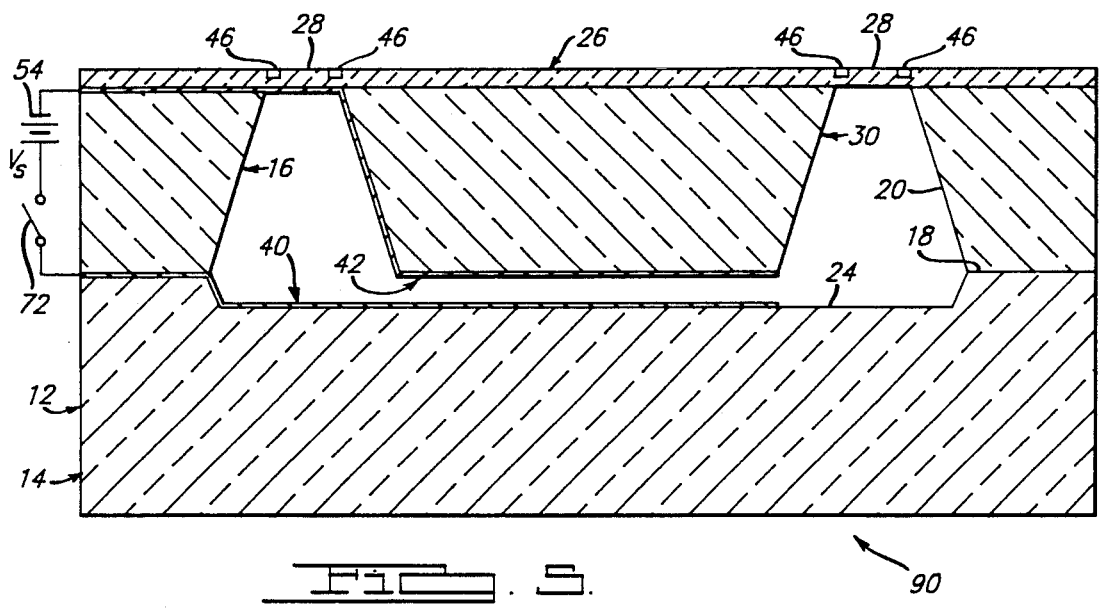
FIG. 5 is a view in cross-section of a second exemplary embodiment of the instant acceleration sensor.
Figure 6:
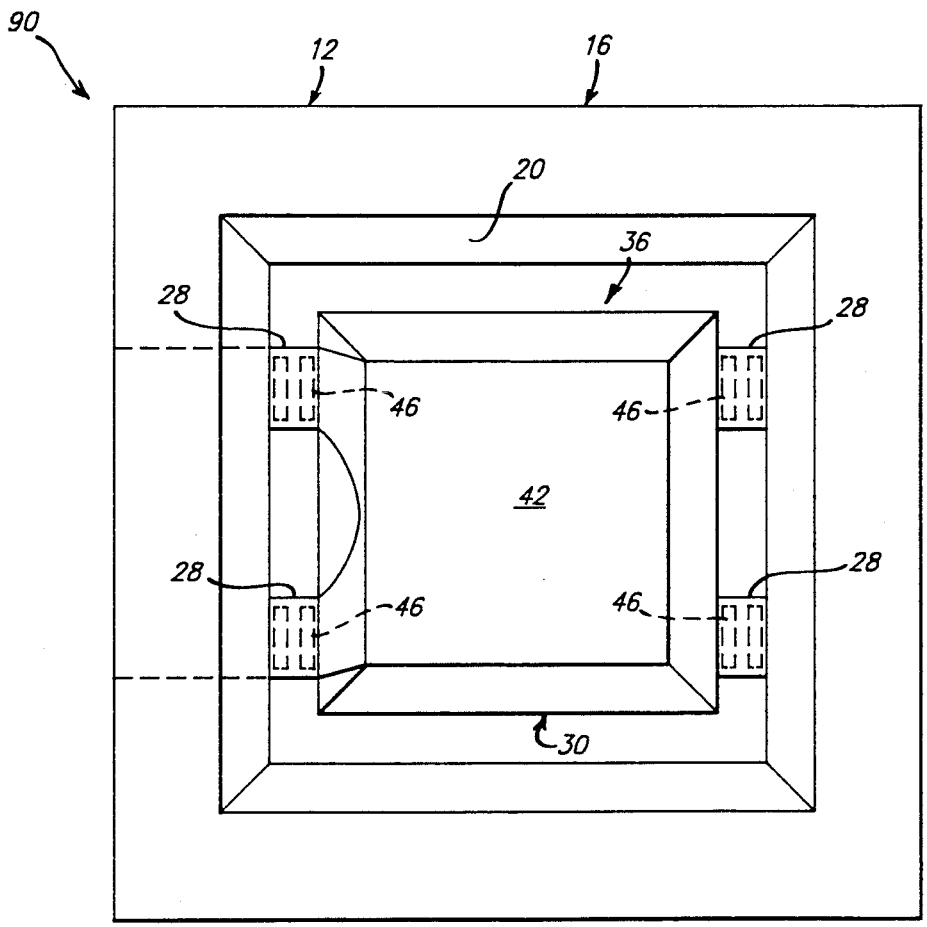
FIG. 6 is a bottom view of the second embodiment of the instant acceleration sensor with the base thereof removed.

FIGS. 5 and 6 show a second embodiment 90 of the acceleration sensor of the instant invention. In the second embodiment 90, the beams 28 provide diametrical support for the sensing mass 30 thereof. Each of the beams 28 is provided with at least one resistor 46 integral therewith. It is noted that, while FIG. 6 shows a total of four beams 28 supporting the sensing mass 30, the instant invention contemplates the use of but two beams 28 to diametrically support the sensing mass 30. Similarly, the instant invention further contemplates the use of a single semiconductor "membrane" to support the sensing mass 30, selected portions of which are doped to provide a plurality of resistors 46 thereon. It is noted that the beam resistors 46 of the second embodiment are connected between the terminals 56, 58, 62, and 64 of the Wheatstone bridge 52 in the manner known to those skilled in the art so as to maximize the change in output therefrom upon displacement of the sensing mass 30 relative to the frame 12.

While the preferred embodiments of the invention have been disclosed, it should be appreciated that the invention is susceptible of modification without departing from the spirit of the invention or the scope of the subjoined claims. For example, under the instant invention, the polarity of the sensing mass 30 may be determined by the substrate material of the sensing mass 30 itself as by connecting it with the voltage supply 54 via metal conduction lines (not shown) deposited on the beams 28 adjacent the resistors 46 formed integral therewith. In this manner, the entire substrate of the sensing mass 30 may be maintained at the proper potential, e.g., at +5 volts DC. And, while the use of a metalized layer 42 as illustrated in the FIGURES and described hereinabove is preferred insofar as it provides greater control during the electrostatic deflection of the sensing mass 30, the polarization of the substrate of the sensing mass 30 is particularly convenient from a manufacturing standpoint since the sensing mass 30 is already electrically isolated from the base 14 by the insulative upper frame section 16, as seen in FIGS. 1 and 5.

We claim:

1. An acceleration sensor comprising a rigid frame; a resilient beam extending from said frame; a sensing mass supported relative to said frame by said beam, said sensing mass being responsive to acceleration of said frame so as to be displaced thereby from an initial position relative to said frame towards a second position of maximum sensing mass displacement relative to said frame, whereby said beam is deflected; a resistor on said beam, the resistance of said beam resistor varying in response to deflection of said beam; means for electrostatically displacing said sensing mass to a third position short of said second position without regard to acceleration; and an electrical circuit responsive to the resistance of said beam resistor for generating an output signal, said output signal being calibrated by displacing said sensing mass to said third position by said electrostatic displacement means.

2. The acceleration sensor of claim 1 wherein said beam is formed of a semiconductor material, and said beam resistor comprises a doped portion of said semiconductor material.

3. The acceleration sensor of claim 1 wherein said electrostatic displacement means comprises
a first layer of nonmagnetic electrically conductive material on said frame;
a second layer of nonmagnetic electrically conductive material on said sensing mass in opposition with said first layer on said frame; and
means for depositing unlike electrical charges on said first and second layers, respectively.

4. The acceleration sensor of claim 3 wherein said means for depositing unlike electrical charges on said first and second layers, respectively, comprises a voltage source switchably connected across said layers.

5. The acceleration sensor of claim 1 including stop means for limiting the amount of displacement of said sensing mass relative to said frame.

6. The acceleration sensor of claim 5 wherein said stop means comprises a plurality of protrusions from said frame engageable with said sensing mass.

7. The acceleration sensor of claim 1 including a second resilient beam extending from said frame to support said sensing mass, said beams providing diametrical support for said sensing mass.

8. The acceleration sensor of claim 1 including gas damping means for damping such displacement of said sensing mass.

9. The acceleration sensor of claim 1 wherein said electrical circuit comprises
a Wheatstone bridge having a pair of input terminals and a pair of output terminals defining the four legs thereof, at least one of said legs comprising a beam resistor;
means for impressing a potential across the input terminals of said bridge; and
means for determining the voltage developed across the output terminals of said bridge.

10. The acceleration sensor of claim 9 wherein said means for determining the voltage developed across the output terminals of said bridge comprises a microprocessor having means thereon connected to each of the output terminals, respectively, for reading the voltage developed thereacross.

11. The acceleration sensor of claim 10 wherein said means on said microprocessor for reading the voltage developed across the output terminals of said bridge comprises an analog-to-digital converter port on said microprocessor connected to the output terminals by a differential amplifier.

12. The acceleration sensor of claim 10 wherein at least one of said legs of said bridge further comprises a first resistor of variable resistance, the resistance of said first resistor being controlled by said microprocessor.

13. The acceleration sensor of claim 10 wherein said first resistor is placed in series with a beam resistor between the terminals defining said leg of said bridge.

14. The acceleration sensor of claim 12 wherein said first resistor of variable resistance comprises a second resistor of fixed resistance and at least one additional resistor of fixed resistances, e of said additional resistors being switched in parallel with said second resistor by a like number of switch means operable by said microprocessor.

15. The acceleration sensor of claim 14 wherein each of said switch means operable by said microprocessor for switching one of said additional resistors in parallel with said second resistor comprises a transistor, the emitter of said transistor being connected to a terminal of said bridge; the collector of said transistor being connected to said additional resistor, and the base of said transistor being connected to said microprocessor, whereby said additional resistor is switchably connected in parallel with said second resistor upon the delivery of current to the base of said transistor by said microprocessor.

16. The acceleration sensor of claim 9 wherein said electrical circuit further comprises
means for actuating said electrostatic displacement means;
means for determining the resultant change in the voltage developed across the output terminals of said bridge; and means for generating a calibrated output signal derived from the instantaneous voltage developed across the output terminals of said bridge.

17. The acceleration sensor of claim 16 wherein said means for generating said calibrated output signal comprises means for comparing the change in the voltage developed across the output terminals of said bridge due to acceleration of said sensing mass relative to said frame with the change in the voltage developed across the output terminals of said bridge due to the electrostatic displacement of said sensing mass relative to said frame.

18. The acceleration sensor of claim 16 wherein said means for generating said calibrated output signal comprises means for determining the instantaneous sensitivity of said sensor by comparing the instantaneous change in the voltage developed across the output terminals of said bridge due to acceleration of said sensing mass relative to said frame with the change in the voltage developed across the output terminals of said bridge due to the electrostatic displacement of said sensing mass relative to said frame; and means for calibrating the instantaneous voltage developed across the output terminals of said bridge in terms of said instantaneous sensitivity.

19. An acceleration sensor having a rigid frame;
a resilient beam extending from said frame;
a sensing mass supported relative to said frame by said beam, said sensing mass being responsive to acceleration of said frame so as to be displaced by such acceleration from an initial position relative to said frame towards a second position of maximum sensing mass displacement relative to said frame, whereby said beam is deflected;
a resistor on said beam, the resistance of said beam resistor varying in response to deflection of said beam;
means responsive to the resistance of said beam resistor for generating an output signal;
means for electrostatically displacing said sensing mass from said initial position towards said second position; and means for calibrating said output signal by electrostatically displacing said sensor mass from said initial position to a third position short of said second position with a known electrostatic field.

20. The acceleration sensor of claim 19 wherein said means responsive to the resistance of said beam resistor for generating said first signal comprises a Wheatstone bridge having a pair of input terminals and a pair of output terminals defining the four legs thereof, one of said legs comprising said beam resistor;

means for impressing a potential across the input terminals of said bridge; and means for determining the voltage developed across the output terminals of said bridge;

and said means for calibrating said output signal comprises means operative to generate said electrostatic field; and means for comparing the change in the voltage developed across the output terminals of said bridge due to acceleration of said sensing mass relative to said frame with the change in the voltage developed across the output terminals of said bridge resulting from the electrostatic displacement of said sensing mass relative to said frame.

21. The acceleration sensor of claim 20 wherein said means operative to generate said electrostatic field exerts an electrostatic force on said sensing mass which approximates a unitary gravitational field.

22. The acceleration sensor of claim 20 including means responsive to the voltage developed across the output terminals of said bridge for varying the resistance of one of the legs of said bridge, whereby the voltage developed across the output terminals of said bridge is maintained in a desired range.

* * * * *

UNITED STATES PATENT AND TRADEMARK OFFICE
CERTIFICATE OF CORRECTION

PATENT NO. : 5,060,504

DATED : October 29, 1991

INVENTOR(S) : Craig W. White, Leonard W. Behr and Kevin E. Musser

It is certified that error appears in the above-identified patent and that said Letters Patent is hereby corrected as shown below:

| | |
|---|---|
| Col. 1, line 16, | after "thereof" insert a period(.) |
| Col. 2, line 1, | after "thereto" insert a period(.) |
| Col. 3, line 54, | after "12" insert a period(.) |
| Col. 6, line 47, | after "thereof" insert a period(.) |
| Col. 8, line 4, | after "calibrating" insert --displacement voltage $V_{D,c}$ and determines the change in-- |
| Col. 8, line 20, | delete "30" |
| Col. 10, line 40, | after "resistances," "e" should be --each-- |
| Col. 12, line 2, | "sensor" should be --sensing-- |

Signed and Sealed this

Ninth Day of March, 1993

Attest:

STEPHEN G. KUNIN

*Attesting Officer*           Acting Commissioner of Patents and Trademarks